United States Patent [19]

Pasetti et al.

[11] Patent Number: 4,797,917
[45] Date of Patent: Jan. 10, 1989

[54] MONOLITHICALLY INTEGRATABLE TELEPHONE CIRCUIT FOR SUPPLYING RINGING SIGNALS TO A SUBSCRIBER'S TELEPHONE LINE AND FOR DETECTING AN OFF THE HOOK CONDITION DURING RINGING

[75] Inventors: Mauro Pasetti, Milan; Marco Siligoni, Vittuone (MI), both of Italy

[73] Assignee: SGS Microelettronica SpA, Milan, Italy

[21] Appl. No.: 79,157

[22] Filed: Jul. 29, 1987

[30] Foreign Application Priority Data

Jul. 29, 1986 [IT] Italy ................ 21284 A/86

[51] Int. Cl.⁴ ............................................. H04M 3/06
[52] U.S. Cl. ..................................... 379/253; 379/382
[58] Field of Search ............... 379/352, 252, 253, 254, 379/255, 382

[56] References Cited

U.S. PATENT DOCUMENTS 4,362,908 12/1982 Melindo ............................ 379/252
4,396,805 8/1983 Wagner ............................. 379/252
4,656,659 4/1987 Chea, Jr. ........................... 379/253

FOREIGN PATENT DOCUMENTS 0143435 6/1985 European Pat. Off. .

*Primary Examiner*—James L. Dwyer
*Attorney, Agent, or Firm*—Wenderoth, Lind & Ponack

[57] ABSTRACT

A telephone circuit, which may be monolithically integrated, for supplying ringing signals to a subscriber's line and for detecting an off the hook condition during ringing includes a circuit for supplying ringing signals coupled to exchange control components for generating a constant frequency sinusoidal signal which gives rise to the ringing signals and an enabling circuit, controlled by the exchange components, for enabling the supplying of the ringing signals to the line and for activating a circuit for detecting a direct current on the line. The circuit for detecting a direct current on the line supplies a signal to a circuit for controlling the detection of an off the hook condition, and which supplies an inhibiting signal for the enabling circuit and check, only after a predetermined time, whether the circuit for detecting a direct current on the line is still supplying a signal and for generating a signal informing the exchange components that the set has been off the hook. The circuit also includes a circuit which amplifies the ringing signals and simultaneously supplies the telephone line. A circuit for generating timing signals synchronizes the operation of the enabling circuit and the circuit which controls the detection of the off the hook condition, and also the supplying of ringing signals to the line, during the times in which the sinusoidal signal generated by the exchange control components has a zero amplitude.

6 Claims, 3 Drawing Sheets

MONOLITHICALLY INTEGRATABLE TELEPHONE CIRCUIT FOR SUPPLYING RINGING SIGNALS TO A SUBSCRIBER'S TELEPHONE LINE AND FOR DETECTING AN OFF THE HOOK CONDITION DURING RINGINGcBACKGROUND OF THE INVENTION

The present invention relates to telephone circuits for detecting the off the hook condition during ringing and for supplying ringing signals to the line, and in particular to telephone circuits for the supplying of ringing signals and for detecting the off the hook condition which may be monolithically integrated and which form an interface between the subscriber's telephone line and the subscriber's line circuit under the control of the exchange control components.

A subscriber's telephone set is generally connected to a telephone exchange by a line whose terminals are connected, in parallel, to both the speech circuit and the ringer.

The speech circuit is in series with a switch which is closed when the set is off the hook; the ringer is in series with a capacitor to prevent the passage of direct current from the line.

A telephone line is in fact supplied by a DC voltage generator, in series with which there is connected an AC voltage generator which forms the source of the ringing signals when the exchange control components generate a control signal for the supply of these signals to the subscriber.

The ringing signals, having a sinusoidal waveform, are supplied to the subscriber at a predetermined ringing rhythm by the exchange control components.

Upon command by these components, the line is supplied with a succession of these signals which are spaced from one another by pauses without signals. When the ringing signals are supplied to the subscriber there is therefore present on the line an alternating ringing current on which a direct current component is superimposed, only when the set has been off the hook.

When no ringing signal is supplied to the subscriber, or during the pauses between the signals, only a direct current component is present on the line when the set has been off the hook.

The detection of the off the hook condition is obtained in modern telephone exchanges by electronic circuit means designed to recognize the variations in the line current, and also to detect the possible presence of a direct current on the line due to the off the hook condition of the set.

Passage from a calling signal supply stage to a pause stage where no signals are supplied, or vice versa, may cause instantaneous voltage and current variations on the line which make it difficult to detect the off the hook condition of the set; these variations may also cause harmonics which may disturb the users of neighboring lines.

The causes of these voltage and current transients may be due to both the difference which normally exists between the value of the direct component supplied to the telephone line during the supply of a ringing signal and the component supplied during the pause without signals, either during the supply or on the discontinuation of a sinusoidal ringing signal to the line at the moment when its voltage amplitude is not zero.

The sinusoidal ringing signals generally have a frequency of between 16 and 66 Hz, with actual voltage values (60–80 V) which are fairly high with respect to those of normal telephone speech signals: if they are not immediately discontinued when the set is off the hook, they are converted by the subscriber's speech circuit into high intensity acoustic signals which may damage the subscriber's hearing as well as the set itself.

To avoid this drawback, the circuit means designed to detect variations in the line current during the off the hook condition should be able to supply a very rapid response, making it possible to immediately interrupt the supply of ringing signals to the line when the off the hook condition takes place. In particular circumstances, the circuit means designed to recognize variations in the line current could, however, interpret a variation in the line current due to other factors, for example disturbances caused by other subscribers, as a direct current variation on the line after the set has been taken off the hook.

To ensure that the set has actually been taken off the hook, following the discontinuation of the supply of ringing signals, the possible presence of a direct component on the line may, for example, be checked for second time, which would confirm that the subscriber has actually taken the set off the hook, as disclosed in U.S. Pat. No. 4,362,908 which relates, however, to a telephone ringing system which may not be monolithically integrated.

SUMMARY OF THE INVENTION

The object of the present invention is to construct a telephone circuit which may be monolithically integrated for the supply of ringing signals and the detection of the off the hook condition during ringing, designed to form an interface between the subscriber's telephone line and the subscriber's line circuit under the control of exchange control components, which keeps the features of accuracy and rapidity of operation of known circuits unchanged and drastically reduces the generation of disturbances on the line with respect to these circuits.

This object may be effected by providing a monolithically integratable telephone circuit for supplying ringing signals and for detecting an off the hook condition during ringing, and forming an interface between a subscriber's telephone line and a subscriber's line circuit under the control of exchange control components, comprises a circuit means for generating timing signals and a circuit means for supplying the telephone line, each having at least a first input terminal for connecting to exchange control components which generate a sinusoidal alternating signal having a frequency equal to the frequency of the ringing signal to be supplied to the line, said circuit means for generating timing signals generating a timing signal when an amplitude of a signal supplied to its first input terminal becomes zero during variations of the signal, said circuit means for supplying the telephone line being coupled to said exchange control components, via a circuit means for supplying ringing signals having an enabling terminal, and also having a first and a second output terminal for connection to the terminals of the subscriber's telephone line; an enabling circuit means and a circuit means for controlling the detection of the off the hook condition each having at least a first and a second input terminal for connection to said circuit means for generating timing signals and to exchange components for generating control signals for supplying ringing signals to the line respectively, these exchange components being further connected to said enabling terminal of said circuit means for supplying of the telephone line, said circuit means for controlling the detection of the off the hook condition further having at least a third input terminal for connection to the line via a circuit means for detecting a direct current on the line, said circuit means for detecting a direct current generating a signal when a direct current present on the line is greater than a predetermined current threshold, and having an enabling terminal, and at least a first and a second output terminal, said second output terminal being connected to exchange control components for receiving and processing signals indicating that an off the hook condition has taken place, said enabling circuit means further having at least a third input terminal for connection to exchange control components for generating control signals for causing a predetermined ringing rhythm, an inhibiting terminal connected to said first output terminal of the circuit means controlling the detection of the off the hook condition, and a first and a second output terminal connected respectively to said enabling terminal of said circuit means for supplying of ringing signals and to said enabling terminal of said circuit means for detecting of direct current on the line.

BRIEF DESCRIPTION OF THE DRAWINGS

The invention is set out in further detail in the following description, given purely by way of non-limiting example, with reference to the attached drawings, in which.

DESCRIPTION OF THE PREFERRED EMBODIMENT

Figure 1:
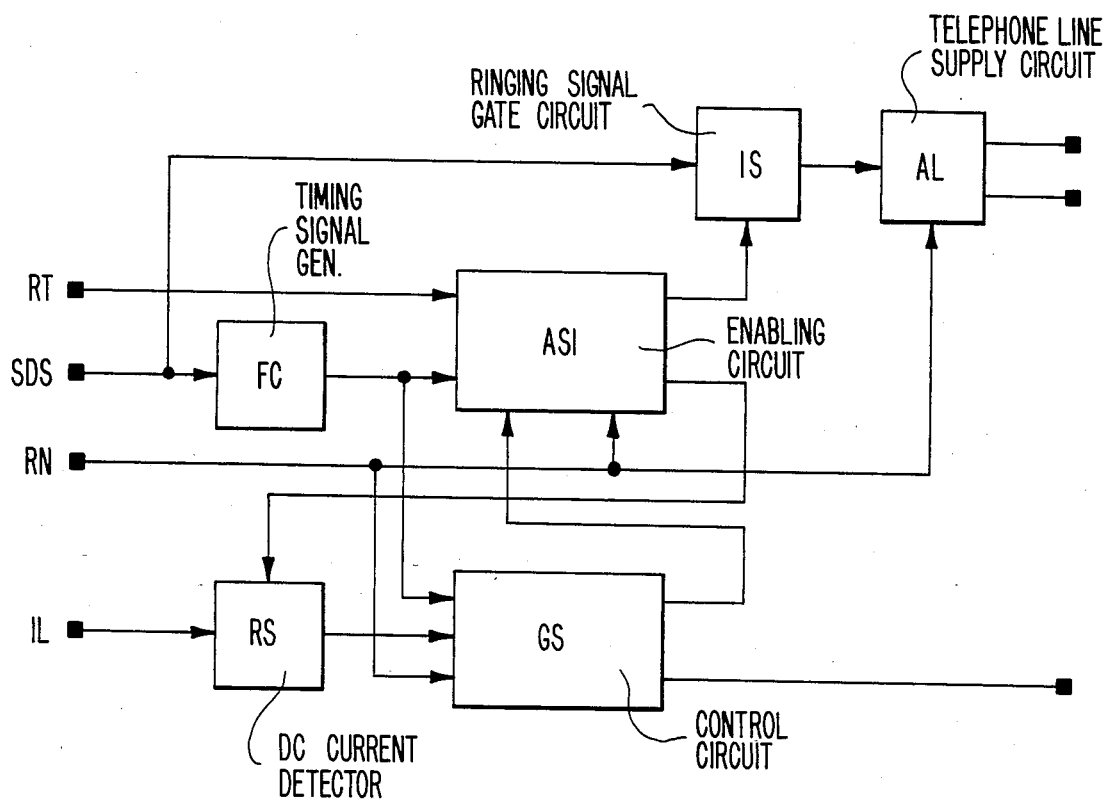
FIG. 1 is a block diagram of a telephone circuit in accordance with the present invention, which may be monolithically integrated, for the supply of ringing signals and the detection of the off the hook condition during ringing.

The block diagram shown in FIG. 1 of a telephone circuit in accordance with the present invention for the supply of ringing signals and the detection of the off the hook condition during ringing comprises a timing signal generator for the generation of timing signals FC, having an input terminal SDS, for connection to exchange components are designed to generate a signal with a wave shape which is substantially sinusoidal and having a frequency identical to the frequency of the sinusoidal ringing signals to be supplied to the line, and having an amplitude which is lower than the amplitude of these signals which originate, however, therefrom, and having an output terminal. SGS Microelettronica SpA Part No. LM 399 may be used as the timing signal generator FC.

FIG. 1 further comprises an enabling circuit ASI, having a first input terminal connected to the output terminal of the timing signal generator FC, a second input terminal RN, for connection to the exchange control components, and designed to generate control signals for the supplying of ringing signals, and having a third input terminal RT, for connection to exchange control components and designed to generate control signals which determine the ringing rhythm.

This enabling circuit ASI also has first and second output terminals and an inhibiting terminal.

This diagram also comprises a ringing signal gate circuit IS for the supplying of ringing signals, having an input terminal which is also coupled to the exchange components which generate a continuous sinusoidal signal, and having enabling terminal which is connected to the first output terminal of the enabling circuit ASI and an output terminal. SGS Microelettronica SpA Part No. 1017 may be used as the ringing signal gate circuit IS.

FIG. 1 also comprises a DC current detector RS for the detection of the direct current present on the line, having a first input terminal IL, which is supplied with the line current or an "image" current of the line current, and having an enabling terminal connected to the second output terminal of the enabling circuit ASI, and having an output terminal.

Figure 1A:
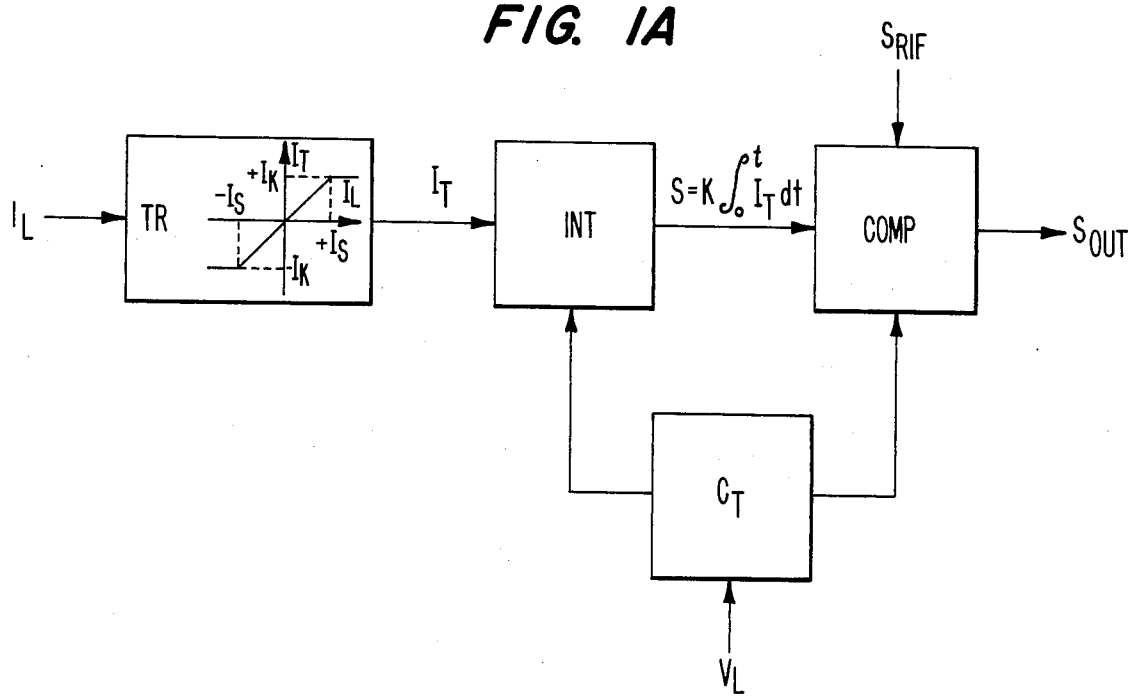
FIG. 1A is a block diagram of the DC current detector RS and FIG. 1B is a circuit diagram of the current transducer circuit TR of FIG. 1A.

FIG. 1A illustrates a block diagram of a known circuit which may be utilized for the DC current detector RS.

A current transducer circuit TR is coupled to a users telephone line and supplies a current $I_T$ which is proportional to the current of the line $I_L$ for current values included between two predetermined threshold values which are opposite in sign and equal in absolute value. When these threshold values are reached, the current supplied by the transducer circuit is maintained constant when the line current varies.

An integrator INT integrates the current supplied by the transducer circuit during one or more full periods of the line voltage.

When the result of such an integration is different from zero, the detector can inform the telephone exchange control equipment that an off-hook condition has taken place.

This is effected by the comparator circuit COMP which compares the integrated value S output from the integrator INT with a reference value $S_{RIF}$.

A control circuit $C_T$ controls the operation of the integrator INT and comparator COMP and is powered by a line voltage $V_L$.

Figure 1B:
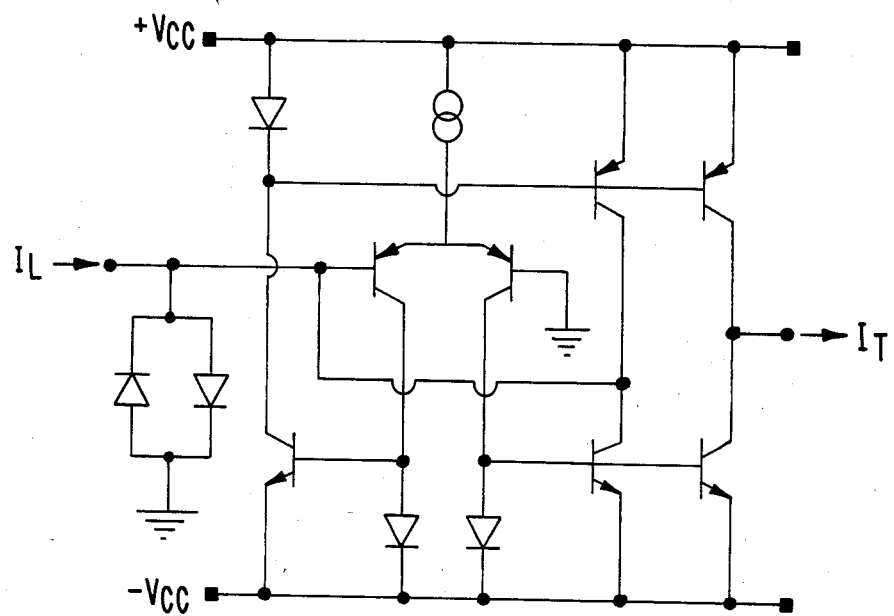

FIG. 1B illustrates a circuit diagram of the transducer circuit TR of FIG. 1A.

For the purpose of brevity, a detailed description of the operation of the block diagram of FIG. 1A and the circuit diagram of FIG. 1B has been omitted. However, it is to be noted that FIGS. 1A and 1B respectively correspond to FIGS. 1 and 3 of published European Patent Application No. 0143435 A2, published on June 5, 1985.

FIG. 1 further comprises a control circuit GS to control the detection of the off the hook condition, having a first input terminal connected to the output terminal of the timing signal generator FC, a second input terminal for connection to the exchange control components which generate the control signal for the supplying of ringing signals, a third input terminal connected to the output terminal of the DC current detector RS, a first output terminal connected to the inhibiting terminal of the enabling circuit ASI, and a second output terminal for connection to the exchange control components.

FIG. 1 finally comprises a telephone line supply circuit means AL for the supplying of the telephone line, having a first input terminal connected to the output terminal of the ringing signal generator IS, an enabling terminal for connection to the exchange control components which generate control signals for the supplying of the ringing signals and a first and second output terminal for connection to the two wires of a subscriber's telephone line. SGS Microelettronica SpA Part No. L3000 may be used as the telephone line supply circuit AL.

It should be noted here that, with the exception of these first and second output terminals of the supply circuit AL, all the terminals of the various blocks of FIG. 1 should be considered as usable for the transmission of both current and voltage signals.

The operation of a telephone circuit in accordance with the present invention will now be examined looking at possible embodiments of the various parts of the circuit.

The timing signal generator FC for the generation of a timing signal may be embodied with the circuit called a "zero crossing detector" known to persons skilled in the art.

The input terminal is supplied with a signal having sinusoidal waveform, supplied from a generator which forms part of the exchange components, having a limited amplitude $1V_{RMS}$) and a frequency equal to the frequency of the ringing signals to be supplied to the line.

This circuit generates as output signals of a pulse type at the moments in which the input signals has a zero amplitude and with a frequency equal to the frequency of the sinusoidal input signal. These signals may be used as timing signals for each function of the circuit.

The enabling circuit ASI, generates at the first output terminal an enabling signal for the ringing signal generator IS for the supplying of call signals when control signals coming from the exchange components are simultaneously supplied to the second and third input terminals.

This enabling signal starts to be generated as output at the first timing signal following the supply of a control signal to the third input terminal and continues to be generated until the first timing signal following the cessation of this control signal.

The generation of this enabling signal may, however, be cancelled by a possible inhibiting signal supplied to the inhibiting terminal of this enabling circuit ASI and generated by the control circuit GS for controlling the detection of the off the hook condition of the set.

To synchronize the timing signals and the sinusoidal input signal, the enabling of the ringing signal gate circuit IS for the supplying of ringing signals is always supplied or cut off only at moments in which the sinusoidal signal, from which the ringing signals originate, has a zero amplitude.

The circuit enabling ASI also generates, at the second output terminal, a signal which enables the operation of the DC current detector RS.

The detection of direct current on the line is, however, enabled in accordance only after a predetermined time interval equal to a whole number of periods of the sinusoidal signal generated by the exchange control components, from the moment at which a signal for supplying or a signal to discontinue the supplying of ringing signals to the line is generated.

Figure 2:
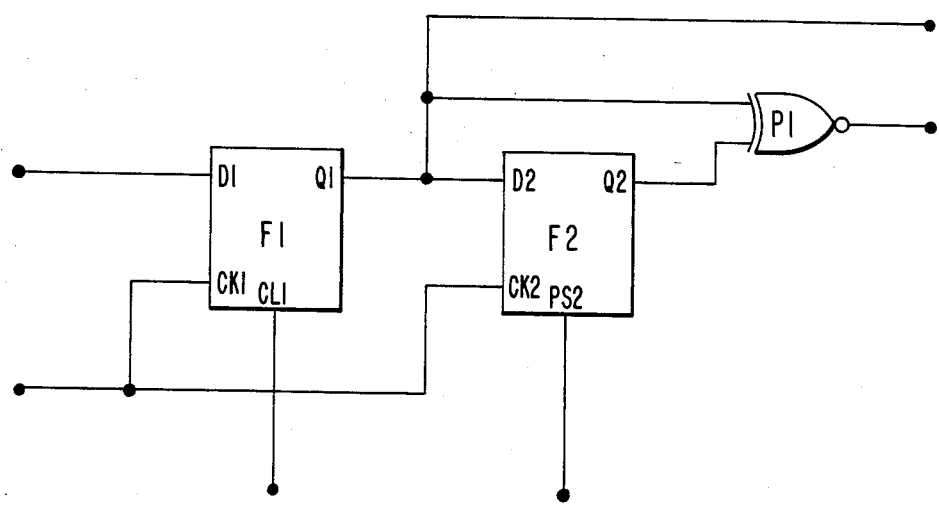
FIG. 2 a circuit diagram of an enabling circuit for the supply of ringing signals included in a telephone circuit in accordance with the present invention.

The enabling circuit ASI may be embodied as a logic circuit comprising, as shown in FIG. 2, a D type flip-flop F1, having a preset terminal D1, a clock input terminal CK1, a reset terminal CL1 and an output terminal Q1.

The enabling circuit also comprises a D type flip-flop F2, having a preset terminal D2, a clock terminal CK2, a preset terminal PS2 and an output terminal Q2.

The enabling circuit also comprises a logic circuit of the "exclusive NOR" type P1 and having a first and a second input terminal and an output terminal.

The clock terminals of the two flip-flops F1 and F2 are connected together to form the first input terminal of the enabling circuit.

The preset terminal D1 of the flip-flop F1 forms the third input terminal of the enabling circuit.

The reset terminal CL1 of the flip-flop F1 forms the inhibiting terminal of the enabling circuit.

The preset terminal PS2 of the flip-flop F2 forms the second input terminal of the enabling circuit means.

The output terminal Q1 of the flip-flop F1 and the terminal D2 of the flip-flop F2 are conected together to the first input terminal of the logic circuit P1 to form the first output terminal of the enabling circuit. The output terminal Q2 of the flip-flop F2 and the second input terminal of the logic circuit P1 are connected together.

The output terminal of the logic circuit P1 forms the second output terminal of the enabling circuit.

The ringing signal gate circuit IS for the supplying of the ringing signal may be constructed with the circuit known to persons skilled in the art as an "electronic switch": it is enabled by the signal generated at the first output terminal of the enabling circuit ASI to begin supplying the line with the sinusoidal signal generated by the exchange components, via the telephone line supply circuit AL which amplitudes this signal, only at moments in which the signal has a zero voltage amplitude.

This makes it possible to satisfy the condition that there are never instantaneous voltage variations on the line due to the supplying of ringing signals, or the discontinuation of the supplying of these signals, at moments in which the amplitude of these signals originating from the sinusoidal signal is not zero.

The supply circuit AL for supplying the telephone line comprises both circuits designed to amplify the ringing signals coming from the gate circuit IS and circuits designed to supply the telephone line with a predetermined constant direct voltage when the exchange control components supply, via the terminal RN, the control signal on which the ringing signals coming from the gate circuit IS are superimposed.

The DC current detector circuit RS, may in contrast be formed by a circuit comprising a line current transducer and an integrator which integrates the current supplied by the transducer over one or more whole periods of the line voltage using solutions which are already known.

When the integrator detects the presence of direct current on the line at a level higher than a predetermined threshold, the circuit generates a signal indicating the presence of direct current on the line, which may be caused by a possible off the hook condition of the set.

The information that direct current is present on the line, however, is further processed by the control circuit GS, to prevent an erroneous off the hook signal.

On the first timing signal following the information that direct current is present on the line, the control circuit GS generates at its first output terminal a signal which causes the inhibition of the enabling circuit ASI, thus causing the operation of the gate circuit IS to be disabled and causing the operation of the DC current detector RS to be disabled.

As described above, enabling of the operation of the DC current detector RS by means of the signal generated at the second output terminal of the enabling circuit ASI is reset after a time interval equal to a predetermined number of periods of the sinusoidal signal from which the ringing signals originate.

It is thus possible to check, after a predetermined time interval, whether a direct current is still present on the line. If this is the case, the signal generated by the DC current detector RS again causes the inhibition of the enabling circuit ASI and the gate circuit IS and the supply circuit AL; while a signal indicating that an off the hook condition has occurred is generated at the second output terminal of the control circuit GS and continues to be generated for as long as a direct current is present on the line and the exchange control components confirm the ringing condition.

As soon as the absence of a direct current component on the line is detected, the inhibition of the enabling circuit ASI is immediately removed and the signal indicating that an off the hook condition has taken place is no longer generated.

The enabling circuit ASI therefore enables the gate circuit IS to supply ringing signals to the line and the operation of the DC current detector RS is also enabled after a period of time equal to a predetermined number of periods of the sinusoidal ringing signal.

The above description relates to the operation of a telephone circuit in accordance with the present invention in the case which the presence of a direct current component is detected on the line during the supply of a ringing signal.

In the case, however, in which the presence of a direct current component is detected on the line when no ringing signal is being supplied to the line (which may occur, for example, when the exchange components have ceased to generate signals for the ringing rhythm supplied to the third input terminal of the enabling circuit ASI), the control circuit GS also generates at the first output terminal an inhibiting signal which inhibits the enabling circuit ASI and therefore disables the supply of ringing signals to the line by the gate circuit IS.

The DC current detector circuit RS also remains disabled for a predetermined period of time equal to a certain number of periods of the sinusoidal ringing signal, from the moment at which the inhibiting signal is generated for the enabling circuit ASI, following which it is again checked, during the following timing signal, to determine whether the previously detected direct current component is still present on the line.

If this is the case, the control circuit GS again generates an inhibiting signal for the enabling circuit ASI and generates at the second output terminal a signal indicating that an off the hook condition has occurred for the exchange components.

In cases in which the absence of a direct current component on the line is detected, the operation of the enabling circuit ASI is no longer inhibited and the off the hook signal is no longer generated.

Figure 3:
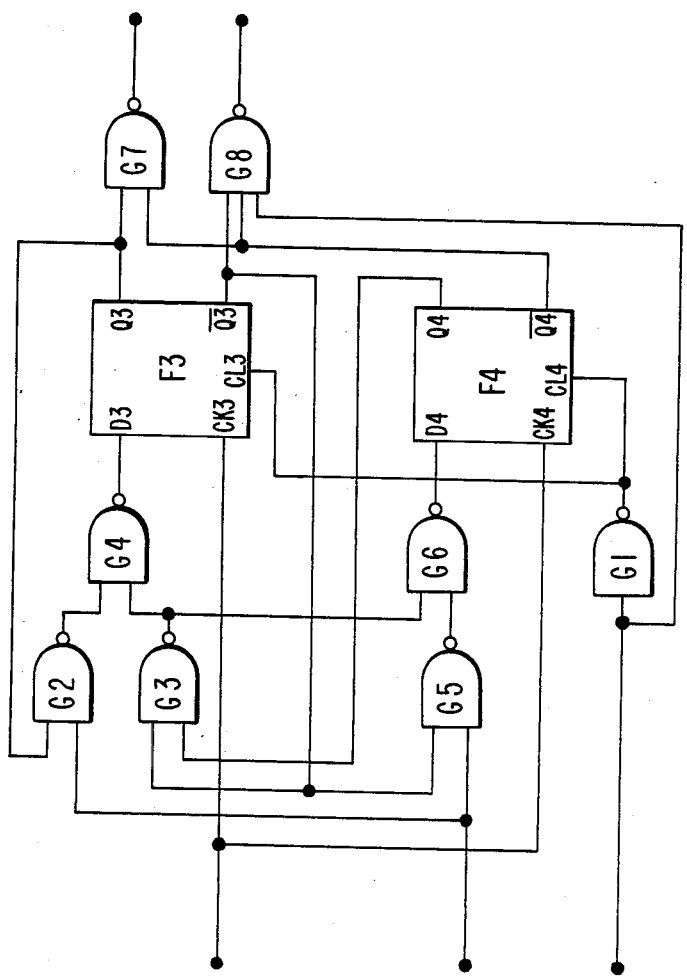
FIG. 3 is a circuit diagram of a circuit for controlling the detection of the off the hook condition included in a telephone circuit in accordance with the present invention and used for the detection of the off the hook condition during ringing.

The control circuit GS may be formed by the logic circuit shown in FIG. 3 and NAND gate G1 having an input terminal and an output terminal, six NAND gate G2, G3, G4, G5, G6, G7 each having first and second input terminals and an output terminal, NAND G8 having first and second and third input terminals and an output terminal.

The control circuit GS also comprises D type flip-flops F3 and F4, respectively having preset terminals D3 and D4, clock terminals CK3 and CK4, reset terminals CL3 and CL4 and two output terminals Q3, $\overline{Q3}$, and Q4 respectively. The clock terminals of the two flip-flops F3 and F4 are connected together to form the first input terminal of the control circuit GS.

The input terminal of the gate G1 and the first input terminal of the gate G8 are connected together to form the second input terminal of the control circuit GS.

The first input terminal of the gate G2 and G5 are connected together to form the third input terminal of the control circuit GS.

The output terminal of the gate G7 forms the first output terminal of the control circuit GS.

The output terminal of the gate G8 forms the second output terminal of the control circuit GS.

The reset terminals CL3 and CL4 of the two flip-flops F3 and F4 are both connected to the output terminal of the gate G1.

The second input terminal of the gate G2 is connected to the first input terminal of the gate G7 and to the first output terminal $\overline{Q3}$ of the flip-flop F3.

The output terminal of the gate G2 is connected to the first input terminal of the gate G4.

The output terminal of the gate G3 is connected to the second input terminal of the gate G4 and to the first input terminal of the gate G6.

The output terminal of the gate G4 is connected to the preset terminal D3 of the flip-flop F3.

The first input terminal of the gate G3 is connected to the first output terminal $\overline{Q4}$ of the flip-flop F4.

The second input terminal of the gate G3, the second input terminal of the gate G5, and the second input terminal of the gate G8 are connected together to the second output terminal Q3 of the flip-flop F3.

The output terminal of the gate G5 is connected to the second input terminal of the gate G6.

The output terminal of the gate G6 is connected to the preset terminal D4 of the flip-flop F4.

The second output terminal Q4 of the flip-flop F4 is connected to the second input terminal of the gate G7 and to the third input terminal of the gate G8.

A telephone circuit in accordance with the present invention, for the supply of ringing signals and the detection of the off the hook condition during ringing, enables the supplying of a ringing signal to the line or the discontinuation thereof at a moment in which the amplitude of the ringing signal is zero, thereby eliminating instantaneous voltage and current variations on the line which might make it difficult to detect the off the hook condition in very short periods and which could generate harmonics such as to disturb the users of neighboring lines; it also enables the value of the direct voltage component supplied to the telephone line to be kept constant both during the supplying of a ringing signal and during the pause without a signal.

It should also be noted that during the supplying of the ringing signal, the detection of the presence of a direct current on the line causes the cessation of the supplying of the ringing signal at the first moment in which the amplitude of the signal is zero, thereby satisfying the requirement of rapid interruption of the supplying of the ringing signal as soon as the presence of a direct current is detected on the line so as not to damage the subscriber's hearing or even his telephone set.

In order to be able to detect only actual off the hook conditions of the set, the presence of a direct component on the line is checked a second time, after a predetermined interval when no signals are being supplied to the line, to supply the exchange components reliably with correct information that the set is off the hook.

Although a single embodiment of the invention has been described and illustrated, it is evident that many variations are possible without departing from the scope of the invention.

We claim:

1. A monolithically integratable telephone circuit for supplying ringing signals and for detecting an off the hook condition during ringing, and forming an interface between a subscriber's telephone line and a subscriber's line circuit under the control of exchange control components, comprises a circuit means fof generating timing signals and a circuit means for supplying the telephone line, each having at least a first input terminal for connecting to exchange control components which generate a sinusoidal alternating signal having a frequency equal to the frequency of the ringing signal to be supplied to the line, said circuit means for generating timing signals generating a timing signal when an amplitude of a signal supplied to its first input terminal becomes zero during signal variations of the [signal]same kind, said circuit means for supplying the telephone line being coupled to said exchange control components, via a circuit means for supplying ringing signals having an enabling terminal, and also having an enabling terminal and a first and a second output terminal for connection to the terminals of the subscriber's telephone line; an enabling circuit means and a circuit means for controlling the detection of the off the hook condition each having at least a first and a second input terminal for connection to said circuit means for generating timing signals and to exchange components for generating control signals for supplying ringing signals to the line respectively, these exchange components being further connected to said enabling terminal of said circuit means for supplying of the telephone line, said circuit means for controlling the detection of the off the hook condition further having at least a third input terminal for connection to the line via a circuit means for detecting a direct current on the line, said circuit means for detecting a direct current generating a signal when a direct current present on the line is greater than a predetermined current threshold, and having an enabling terminal, and at least a first and a second output terminal, said second output terminal being connected to exchange control components for receiving and processing signals indicating that an off the hook condition has taken place, said enabling circuit means further having at least a third input terminal for connection to exchange control components for generating control signals for causing a predetermined ringing rhythm, an inhibiting terminal connected to said first output terminal of the circuit means controlling the detection of the off the hook condition, and a first and a second output terminal connected respectively to said enabling terminal of said circuit means for supplying of ringing signals and to said enabling terminal of said circuit means for detecting of direct current on the line.

2. A telephone circuit as recited in claim 1, wherein said enabling circuit means includes means for supplying, via said first output terminal thereof, an enabling signal to said circuit means for supplying of ringing signals when a signal generated by said exchange control components is supplied to said second input terminal thereof and when no signal is supplied to said inhibiting terminal thereof, only for the time interval between a first timing signal supplied to the first input terminal following the supplying of a signal to said third input terminal, and said first timing signal being supplied to said first input terminal following the cessation of said signal supplied to said third input terminal and for supplying, via said second output terminal thereof, an enabling signal to said circuit means for detecting direct current on the line for the entire time in which a signal is supplied to said second input terminal, with the exception of those time intervals between each timing signal during which the generation of said enabling signal which is supplied via said first output terminal is initiated, and a subsequent predetermined timing signal, and between each timing signal during which the generation of said enabling signal is terminated and a subsequent predetermined timing signal.

3. A telephone circuit as recited in claim 1, wherein said circuit means for controlling the detection of the off the hook condition includes means for supplying an inhibiting signal, via said first output terminal thereof, to said enabling circuit means when a signal is supplied to said second input terminal thereof, only, during a time interval between when a first timing signal is supplied to said first input terminal following the supply of a signal generated by said circuit means for detecting of direct current on the line to said third input terminal and when a first timing signal following the cessation of this signal is supplied to said third input terminal, after a predetermined number of timing signals from the supply of this signal to said third input terminal and for supplying a signal indicating that an off the hook condition has taken place via said second output terminal thereof only when, during a first timing signal after said predetermined number of timing signals, there is still the simultaneous supply of a signal to said second input terminal and to said third input terminal, said signal indicating an off the hook condition being generated for an entire time interval between said first timing signal following said predetermined number of timing signals and said first timing signal following the cessation of said signal supplied to said third input terminal.

4. A telephone circuit as recited in claim 1, wherein said circuit means for supplying the telephone line comprises a circuit mean for supplying the subscriber's telephone line coupled to its two output terminals and for transmitting via the line, when a signal generated by said exchange control components is supplied to its input terminal, a sinusoidal signal having a frequency equal to that of said signal supplied to its input terminal.

5. A telephone circuit as recited in claim 2, wherein said enabling circuit means comprises: a first D type flip-flop having a preset terminal which forms said third input terminal of said enabling circuit means, clock input terminal, a reset terminal which forms said inhibiting terminal of said enabling circuit means and an output terminal; a second D type flip-flop having a preset terminal, a clock input terminal, an output conditioning terminal which forms said second input terminal of said enabling circuit means and an output terminal; an exclusive NOR circuit having first and second input terminals and an output terminal which forms said second output terminal of said enabling circuit means; said clock input terminals of said first and second flip-flops being connected together to form said first input terminal of said enabling circuit means, and said first input terminal of said exclusive circuit NOR being connected to said output terminal of said first flip-flop and to said preset terminal of said second flip-flop which are connected together to form said first output terminal of said enabling circuit means, and said second input terminal of said exclusive NOR circuit being connected to said output terminal of said second flip-flop.

6. A telephone circuit as recited in claim 3, wherein said circuit means controlling the detection of the off the hook condition comprises: a first NAND circuit having an input terminal and an output terminal; a second, a third, a fourth, a fifth, a sixth and a seventh NAND circuit each having first and second input terminals and an output terminal; an eighth NAND circuit having first, second and third input terminals and an output teminal, first and second D type flip-flops each having a preset terminal, a clock input terminal, a reset terminal and two output terminals, said clock input terminals of said first and second flip-flops being connected together to form said first input terminal of said circuit means for controlling the detection of the off the hook condition, said input terminal of said first NAND circuit and said first input terminal of said eighth NAND circuit being connected together to form said second input terminal of said circuit means for controlling the detection of the off the hook condition, said first input terminal of said second NAND circuit and said first terminal of said fifth NAND circuit being connected together to form said third input terminal of said circuit means, said output terminal of said seventh NAND circuit forming said first output terminal of said circuit means for controlling the detection of the off the hook condition, and said output terminal of said eighth NAND circuit forming said second output terminal of said circuit means, said reset terminals of said first and second flip-flops both being connected to said output terminal of said first NAND circuit, said second input terminal of said second NAND circuit being connected to said first input terminal of said seventh NAND circuit and to said first output terminal of said first flip-flop, said output terminal of said second NAND circuit being connected to said first input terminal of said fourth NAND circuit, said output terminal of said third NAND circuit being connected to said second input terminal of said fourth NAND circuit and to said first input terminal of said sixth NAND circuit, said output terminal of said fourth NAND circuit being connected to said preset terminal of said first flip-flop, said first input terminal of said third NAND circuit being connected to said first output terminal of said second flip-flop, said second input terminal of said third NAND circuit and said second input terminal of said fifth NAND circuit and said second input terminal of said eighth NAND circuit being connected together to said second output terminal of said first flip-flop, said output terminal of said fifth NAND circuit being connected to said second input terminal of said sixth NAND circuit, said output terminal of said sixth NAND circuit being connected to said preset terminal of said second flip-flop, said second output terminal of said second flip-flop being connected to said second input terminal of said seventh NAND circuit and to said third input terminal of said eighth NAND circuit.

* * * * *